United States Patent
Congdon, Jr. et al.

(10) Patent No.: US 9,549,298 B2
(45) Date of Patent: Jan. 17, 2017

(54) PUSH-TO-TALK FUNCTIONS ASSOCIATED WITH A ROTARY KNOB

(71) Applicant: Kodiak Networks Inc., Plano, TX (US)

(72) Inventors: Ardsley Pihl Congdon, Jr., Highland Village, TX (US); Brahmananda R. Vempati, Dallas, TX (US); Krishnakant M. Patel, Richardson, TX (US); Ravi Ayyasamy, Richardson, TX (US); Pratap Chandana, Plano, TX (US); Gregory James Morton, Allen, TX (US)

(73) Assignee: KODIAK NETWORKS INC., Plano, TX (US)

( * ) Notice: Subject to any disclaimer, the term of this patent is extended or adjusted under 35 U.S.C. 154(b) by 0 days.

(21) Appl. No.: 14/937,375

(22) Filed: Nov. 10, 2015

(65) Prior Publication Data

US 2016/0135018 A1 May 12, 2016

Related U.S. Application Data (60) Provisional application No. 62/116,012, filed on Feb. 13, 2015, provisional application No. 62/077,395, filed on Nov. 10, 2014.

(51) Int. Cl.
*H04B 7/00* (2006.01)
*H04W 4/10* (2009.01)
*H04M 1/23* (2006.01)

(52) U.S. Cl.
CPC ............... *H04W 4/10* (2013.01); *H04M 1/233* (2013.01)

(58) Field of Classification Search
None
See application file for complete search history.

(56) References Cited

U.S. PATENT DOCUMENTS

| | | | | |
|---|---|---|---|---|
| 2005/0186970 A1* | 8/2005 | Yates | ....................... | H04W 4/10 455/456.5 |
| 2006/0140173 A1* | 6/2006 | Hoover | ............... | H04M 3/2218 370/352 |
| 2007/0021136 A1* | 1/2007 | Allen | ................... | H04B 1/3833 455/518 |
| 2011/0271183 A1* | 11/2011 | Bose | ....................... | G06F 3/038 715/702 |

* cited by examiner

*Primary Examiner* — Mohammed Rachedine
(74) *Attorney, Agent, or Firm* — Slater Matsil, LLP (57) ABSTRACT

An embodiment method includes determining, by a server, a current position of a rotary knob equipped on a client device connected to the server. The method also includes determining, by the server, a push-to-talk (PTT) over cellular (PoC) configuration assigned to the current position of the rotary knob and performing, by the server, PoC operations for the client device in accordance with the PoC configuration assigned to the current position of the rotary knob.

19 Claims, 6 Drawing Sheets

PUSH-TO-TALK FUNCTIONS ASSOCIATED WITH A ROTARY KNOB

This patent application claims priority to U.S. Provisional Application No. 62/077,395, filed on Nov. 10, 2014 and entitled "Push-To-Talk Functions Associated with a Rotary Knob on a Device," which application is hereby incorporated by reference herein as if reproduced in its entirety.

This patent application claims priority to U.S. Provisional Application No. 62/116,012, filed on Feb. 13, 2015 and entitled "Push-To-Talk Functions Associated with a Rotary Knob on a Device," which application is hereby incorporated by reference herein as if reproduced in its entirety.

TECHNICAL FIELD

The present invention relates generally to communications over a telecommunications network, and in particular embodiments, to techniques and mechanisms for push-to-talk functions associated with a rotary knob.

BACKGROUND

Push-to-talk over cellular (PoC) platforms involve providing PoC functionality (e.g., call group management, call origination, call transmittal, talk-back call termination, floor management, filtering, etc.) through clients on client devices. The PoC functions may be performed by one or more servers, and communications between the client devices and the servers may be performed over a telecommunications network (e.g., a carrier network). The functionality provided to the client device may be PoC-specific. However, many client-devices may be generic user equipment without dedicated hardware for PoC functions.

SUMMARY OF THE INVENTION

Technical advantages are generally achieved, by embodiments of this disclosure which describe Rotary Knob for Push to Talk.

In accordance with an embodiment, a method includes determining, by a server, a current position of a rotary knob equipped on a client device connected to the server. The method also includes determining, by the server, a push-to-talk (PTT) over cellular (PoC) configuration assigned to the current position of the rotary knob and performing, by the server, PoC operations for the client device in accordance with the PoC configuration assigned to the current position of the rotary knob.

In accordance with another embodiment, an application server includes a processor and a computer readable storage medium storing programming for execution by the processor. The programming includes instructions to receive a current position of a rotary knob equipped on a client device, determine a push-to-talk (PTT) over cellular (PoC) configuration assigned to the current position of the rotary knob; and perform PoC operations for the client device in accordance with a PoC configuration assigned to the current position of the rotary knob.

In accordance with yet another embodiment, a rotary knob includes a dial configured to be turned to one of a plurality of possible positions. The rotary knob also includes a position sensor configured to detect a position of the dial and a transmitter configured to transmit the position of the dial to a client device. A server connected to the client device is configured to: determine a push-to-talk (PTT) over cellular (POC) configuration assigned to the position of the dial and perform PoC operations for the client device in accordance with the PoC configuration assigned to the position of the dial.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Various embodiments are described with respect to a specific context, specifically, a rotary knob attached to a client device to provide push-to-talk (PTT) over cellular (PoC) functionality. Embodiments, however, may be applied to other communication schemes, particularly where a rotary knob improves device functionality.

Figure 1:
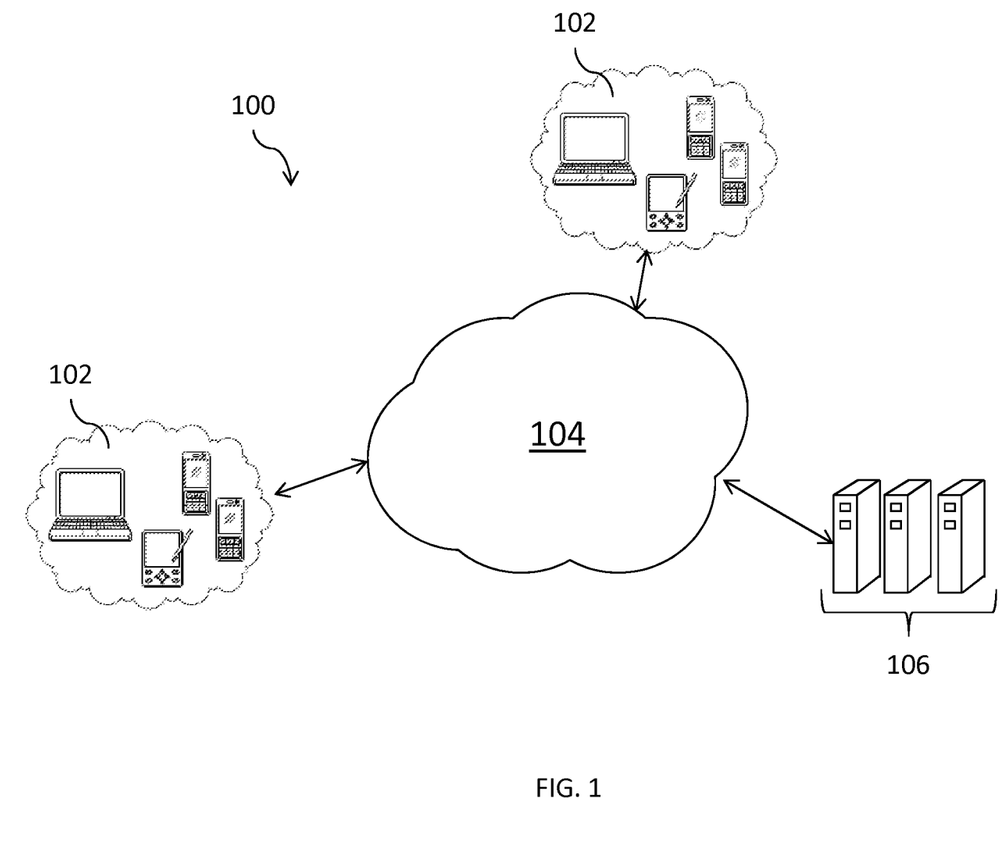
FIG. 1 illustrates a diagram of an embodiment communications network according to some embodiments.

FIG. 1 illustrates a communications system 100, which provides an architecture for supporting a PoC communications solution in accordance with some embodiments. Communications system 100 includes client devices 102, a communications network 104, and one or more application servers 106. As used herein, the term "client device" refers to any component (or collection of components) capable of establishing a connection with a communications network, such as a user equipment (UE), a mobile station (STA), a cellular phone, a tablet, a laptop, and other wirelessly enabled devices. Applications (referred to hereinafter as "PoC clients") reside on client devices 102 for accessing various PoC functions. Furthermore, in various embodiments, client devices 102 are equipped with rotary knobs, and PoC functions are assigned to the rotary knobs (e.g., based on a position of the rotary knob) for an improved user interface as explained in greater detail below.

Subscribers to the PoC solution (e.g., users operating client devices 102) can be provisioned onto system 100 via interfaces to carriers (e.g., cellular carriers). PoC customers (e.g., enterprises) can administer there subscribers to form closed groups for PoC communications. The PoC solution may interface with the carrier, for example, by including connectivity to the carrier's core network, billing interfaces, provisioning interfaces, lawful intercept interfaces, customer care interfaces, and the like.

Application servers 106 provide PoC functions to client devices 102 through the PoC clients on client devices 102. In various embodiments, servers 106 may be deployed as part of a carrier network, hosted separately from the carrier networks, or a combination thereof. Servers 106 may include servers organized in one or more functional layers, such as a PoC service layer and a management layer. In an embodiment, the PoC service layer may include a randezvous (RV) server (e.g., providing end-to-end encryption for PoC user traffic), a session initial protocol (SIP) server (e.g., receiving, managing, and routing SIP communications between client devices 102 and servers 106), PoC servers (e.g., handling PoC session management by implementing a control plane portion of a PoC service), media servers (e.g., handling bearer traffic by implementing a user plane portion of a PoC service), presence servers (e.g., implementing a presence enabler for a PoC service), XML document management (XDM) servers (e.g., implementing a XDM enabler as requested for a PoC service), a LI CCC Media Server (e.g., handling AMR to G.711 codec transcoding to bridge a voice over internet protocol (VoIP) call leg and a signaling system 7 (SS7) circuit switched call leg of a PoC service), a LI CCC (e.g., routing call content from a server), combinations thereof, and the like. Other servers may also be included in the PoC service layer. In an embodiment, the management layer may include element management system (EMS) servers (e.g., an operations, administration, and maintenance platform for the PoC system), billing servers, web customer service representative (WCSR) servers (e.g., providing web interface to customer care representatives for managing end user provisioning and account maintenance), web group provisioning (WGP) servers (e.g., providing an interface for corporate administrators to manage PoC contacts and groups of client devices), LI (lawful intercept) EMS server, a LI server, a load balancer, a messaging (e.g., paging) server, a PTT account management server (PAM server), a log server, combinations thereof, and the like. Other servers may also be included in an embodiment system depending on system design.

Client devices 102 may communicate with servers 106 over the Internet, an IP network, or the like, which may be accessed by client devices 102 through a cellular network deployed by a carrier, a WiFi network, a radio access network (RAN), other wireless networks, a wired network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other wireless devices, such as relays, low power nodes, etc. Network 104 may further include backhaul network components, such as various gateways, routers, controllers, schedulers, and the like. A more detailed description of a PoC system architecture can be found in U.S. patent application Ser. No. 14/286,427, filed on May 23, 2014 and entitled "Method to Achieve a Fully Acknowledged Mode Communication (FAMC) in Push-To-Talk-Over-Cellular (POC)," which application is hereby incorporated by reference herein as if reproduced in its entirety.

Figure 2A:
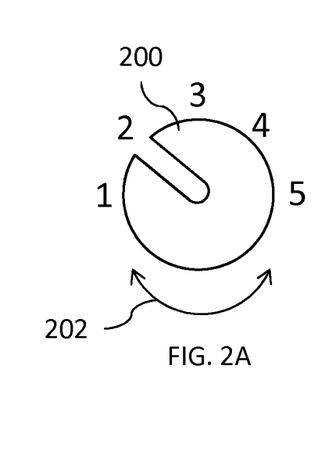
FIGS. 2A and 2B illustrate a top-down view and a block diagram of a rotary knob in accordance with some embodiments.

FIG. 2A illustrates a rotary knob 200 in accordance with some embodiments. Rotary knob 200 may be equipped on a client device, such as client device 102 as described above. Rotary knob 200 includes a dial that can be rotated into different possible positions (sometimes referred to as channels) as indicated by arrow 202. For example, FIG. 2A illustrates five possible positions (labeled 1, 2, 3, 4, and 5) for rotary knob 200. In other embodiments, rotary knobs may have any number of tunable positions. Depending on a specific position of rotary knob 200, a PoC client may operate in a particular PoC configuration, and an application server (e.g., one or more servers 106 as described above) may perform particular PoC functions for the client device in accordance with the selected PoC configuration to enhance the PTT user experience. The client configurations assigned to rotary knob 200 positions may work in conjunction with features provided by a PTT service (e.g., as described above with respect to FIG. 1), and such client configurations may involve both the PoC client on the client device and one or more PoC servers.

In various embodiments, operations performed for the client device may depend on a current position of rotary knob 200. For example, one or more PoC configurations may be assigned to each possible position of rotary knob 200, and PoC operations (e.g., call origination, termination, call type, etc.) performed by a server on behalf of the client device may be vary depending on a PoC configuration of the selected rotary knob position. In some embodiments, a user operating the client device may assign PoC configurations to each possible position of rotary knob 200, for example, through the PoC client on the client device. In another embodiment, an administrator may assign PoC configurations to each possible position of rotary knob 200, for example, through an interface to the server that allows the administrator to perform user-specific configurations. Each knob position can be assigned to configurations allowing and/or prohibiting specific function(s), which may be the same or different than the configurations of other knob positions.

Functions allowed by each position of rotary knob 200 can be configured to influence only PTT origination or both PTT origination and termination. For example, in some PoC configurations, rotary knob 200 only influences PTT origination, and incoming calls to the client device are unaffected by rotary knob position. In such configurations, filtering incoming calls may be achieved using configurations that are separate and independent from rotary knob position.

In some PoC configurations (e.g., as determined by a position of a rotary knob), a client device can be assigned to a pre-arranged group, and the client device is always allowed to receive calls from a currently assigned group. In other PoC configurations (e.g., as determined by a position of a rotary knob), the client device may be assigned to no groups. In PoC configurations that allow incoming calls from other groups, one-to-one calls, ad hoc calls, calls from specific pre-arranged groups, or a combination thereof may or may not be allowed depending on rotary knob position. If incoming calls are allowed then the following configurations may apply: allow talk-back (e.g., the PTT button allows the client device to take the floor during current call) and/or allow origination to assigned group(s) with pre-emption (e.g., the PTT button ends current call and originates call to assigned group or takes floor if the current call is with the assigned group). In another PoC configuration, no incoming calls from other groups may be allowed. In yet another PoC configuration, the rotary knob position may also configure the PoC client to inhibit transmissions (e.g., receive only with no origination and no talkback). Features such as talk-group scanning can be realized by assigning multiple groups to the knob position along with their associated priorities. For example, calls from a group with a higher priority pre-empts calls from groups with a lower priority. When multiple groups are assigned a knob position, a default group may be selected for PTT originations.

In PoC configurations affecting PTT origination, a rotary knob's position may affect a function performed by the application server when a PTT button (or other trigger mechanism) is pushed and the client device is idle (e.g., no current PTT call). The client device may be awake, asleep, locked, or have a PTT application displaying a particular screen (e.g., a home screen, a history screen, or the like). The functions triggered while the client device is idle may include: no action (e.g., do not originate call), originate a call to the most recent history event, originate a call to a specific user-assigned contact, originate a call to a specific user-assigned pre-arranged group, and the like. In an embodiment, the PoC configuration may also affect the function performed by the application when a PTT is pushed and the client device is not in an idle state (e.g., a PTT is ongoing). The functions triggered while the client device is not idle may include: talk-back (e.g., of the PTT button to take control, such as take the floor, of incoming calls) or origination always (e.g., the PTT button to pre-empt current calls with an outgoing call or take the floor if a current call is to an assigned group/contact). Throughout the description, a PTT call can be represented by a session or characterized by a sequence of volleys occurring within a pre-determined period of time.

As an example of PTT client configurations affecting PTT origination, when rotary knob 200 is in a first position (e.g., position 2), the PTT button may trigger talk-back and origination to a most recent history event. When rotary knob 200 is in a second position (e.g., position 4), the PTT button may trigger call origination to an assigned contact (e.g., dispatcher A). When rotary knob is in a third position (e.g., position 5), the PTT button may trigger call origination to an assigned group (e.g., Sales Group). The specific configurations assigned to the different positions of the rotary knob discussed above is for illustrative sake only, the various position of rotary knob 200 may be assigned any configuration.

In PoC configurations affecting PTT origination, the position of rotary knob 200 may affect both call origination and termination. For termination feature control, a knob position may determine which incoming PTT calls are allowed. For example, depending on a position of rotary knob 200, only calls from pre-assigned group(s) can be received by the client device. Dialing the knob to a position results in the device registering for incoming PTT calls from specific group(s), and the PTT Server only delivers PTT calls from the group(s) assigned to the knob position. PTT calls from all other groups are blocked at the server. The knob position may also determine whether one-to-one (1-1) and/or ad-hoc calls are delivered to the client device. For call origination, the PTT button can be configured for talk-back or originate always to a selected user, group, recent history event, or the like as described above. The groups assigned for origination and termination may or may not be the same for each position of rotary knob 200. In some embodiments, other PTT features may be incorporated into the rotary knob configurations.

As an example, when rotary knob 200 is in a first position (e.g., position 2), the PTT button may trigger call origination to a first user-assigned group (e.g., Group A). When the rotary knob 200 is in the first position, the PoC configuration may further allow calls only from Group A, allow 1-1 calls, and block ad hoc calls. When rotary knob 200 is in a second position (e.g., position 4), the PTT button may trigger talk-back and origination to a second user-assigned group (e.g., dispatcher B). When the rotary knob 200 is in the second position, the PoC configuration may further allow calls only from Group B, allow 1-1 calls, and allow ad hoc calls. When rotary knob is in a third position (e.g., position 5), the PTT button may trigger talk-back and origination to a third user-assigned group (e.g., Group D). When the rotary knob 200 is in the second position, the PoC configuration may further allow calls only from Groups A, C, and D, allow 1-1 calls, and allow ad hoc calls. The specific PoC configuration assigned to the different positions of the rotary knob discussed above is for illustrative sake only, and the various position of rotary knob 200 may be assigned any configuration.

In various embodiments, PoC configuration functions (e.g., groups, priorities, incoming call filtering, PTT origination, PTT termination, transmit inhibit, and the like) can all be enforced at an application server. For example, a server may originate calls for the client device when a PTT button is pressed based on PoC configuration of the client device. As another example, the server may filter certain incoming calls to the client device depending on the PoC configuration of the client device. As another example, to enforce transmit inhibit, the client device may still transmit radio signals to an application server, but the application server may filter the outgoing transmissions from transmitting to an intended target.

The application server may determine the PoC configuration of a client device, for example, using transmissions from the client. For example, the client device may transmit the PoC configurations assigned to each knob position to the server, and the client device may further transmit a current rotary knob position to the server. Thus, the server can determine a current PoC configuration of the client device. The rotary knob position may be retransmitted at predetermined intervals to ensure freshness. Alternatively, the rotary knob position can be retransmitted only when a change in position occurs, and the server assumes a received knob position is fresh until an updated position is received. In another embodiment the client device may transmit a current PoC configuration to the server directly, and the server operates accordingly. In yet another embodiment where an administrator assigns PoC configurations, the assignments may be made at the server or the server may receive PoC configuration assignments from another application server where the assignments were made. In such embodiments, the client device may transmit only the current position of the rotary knob to the application server without transmitting PoC configuration assignments corresponding to various knob positions.

Figure 2B:
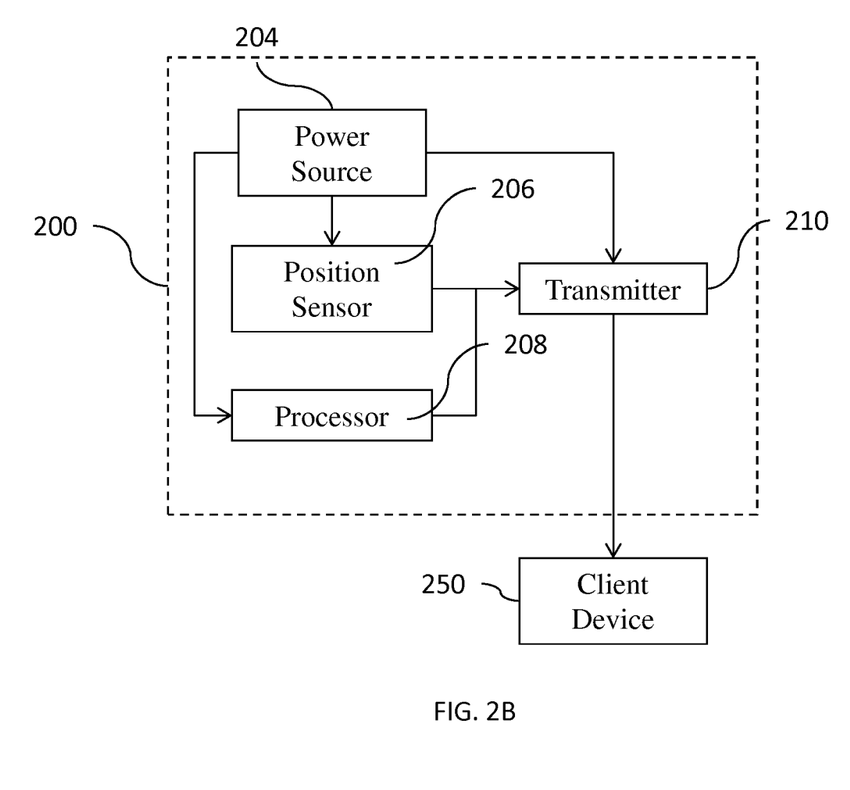

FIG. 2B illustrates a block diagram of circuitry within rotary knob 200 in accordance with some embodiments. Rotary knob 200 includes a power source 204, a position sensor 206, a processor 208, and a transmitter 210. In various embodiments, power source 204 may or may not be independent from a client device. For example, power source 204 may harvest power from a client device 250 through an audio port of client device 250 as described in greater detail below, through a power circuit in client device 250 electrically connected to rotary knob 200, a wireless power source or through any other mechanism. In another example, power source 204 may be a battery. Position sensor 206 may be used to detect a position of rotary knob 200's dial. For example, position sensor 206 may include a detent mechanism, a potentiometer, a rotary switch, or any other suitable mechanism. In an embodiment where position sensor 206 is a rotary switch, multiple pins on a rotary switch can be measured (e.g. open/short, voltage/no voltage, voltage level, resistance value, capacitance value, etc.) by a processor (e.g., processor 208) to determine switch position. Processor 208 may enable client device 250 to detect when rotary knob 200 is connected. For example, processor 208 may generate an identification signal so that client device 250 can detect rotary knob 200 is connected. When the PoC client detects the identification signal, the PoC client may allow assignment of PoC configurations to various positions of rotary knob 200 and trigger an application server to perform PoC operations accordingly. In some embodiments, the rotary knob detection protocol includes lightweight peer discovery, authentication, command, and response data overlaid over an access interface between the rotary knob and the client device.

Transmitter 210 is used to transmit various signals to client device 250. For example, transmitter 210 can transmit a position of rotary knob 200 (e.g., as detected by position sensor 206), transmit an identification signal from processor 208, and the like. Transmitter 210 may be connected to client device 250 by a wired (e.g., electric circuitry, through an audio jack, and the like) or a wireless (e.g., Bluetooth) connection. In some embodiments, transmitter 210 transmits the position of rotary knob 200 directly to client device 250. In other embodiments transmitter 210 transmits a parameter, which allows client device 250 to determine a corresponding rotary knob position. For example, when position sensor 206 is a potentiometer, transmitter 210 may transmit a voltage reading, and client device 250 determines the position of rotary knob 250 from the voltage reading.

Figure 3:
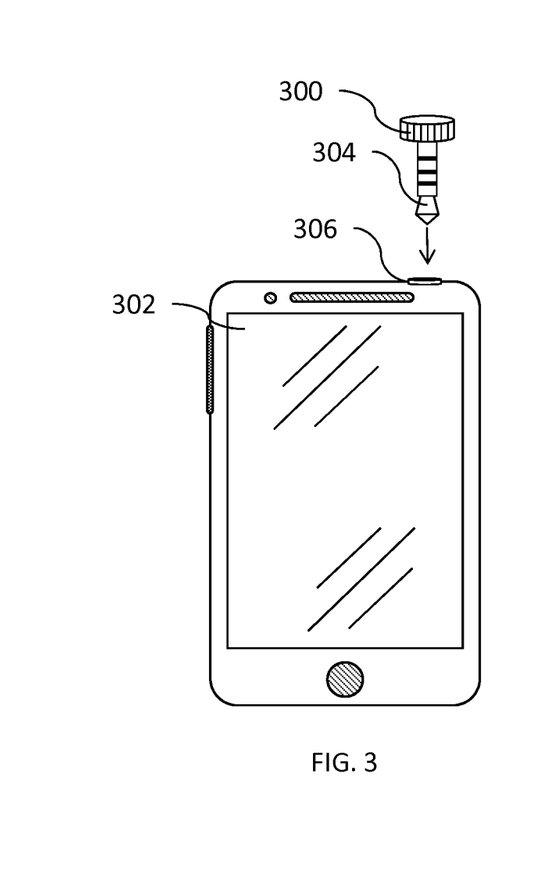
FIGS. 3 and 4 illustrate rotary knob connected with a client device in accordance with some embodiments.

In an embodiment, the rotary knob may be native to the client device. In other embodiments, the client device may be a generic device without a native rotary knob. In such embodiments, a rotary knob attachment with embedded electronic circuits may be attached to the generic client device. For example, FIG. 3 illustrates a rotary knob 300 connected to a client device 302 using a wired connection interface according to some embodiments. In the illustrated embodiment, client device 302 is a cellular phone although other client devices may be used in other embodiments. Rotary knob 300 includes an audio jack 304, which can be plugged into an audio port 306 of client device 302. In an embodiment, audio port 306 is a 3.5 mm audio port. In other embodiments, a wired connection interface between rotary knob 300 and device 302 may include a lightning connector/lightning port, a universal serial bus (USB) connector/USB port, and the like in lieu of an audio jack/audio port interface. Rotary knob 300 includes embedded electronic circuits to detect position of rotary knob 300, harvest power from audio jack 304, and transmit a signal to client device 302 in order to covey a position of rotary knob 300. A PoC client (or other app) on client device 302 may then perform PoC operations based on a signaled position of rotary knob 300 as described above.

Figure 4:
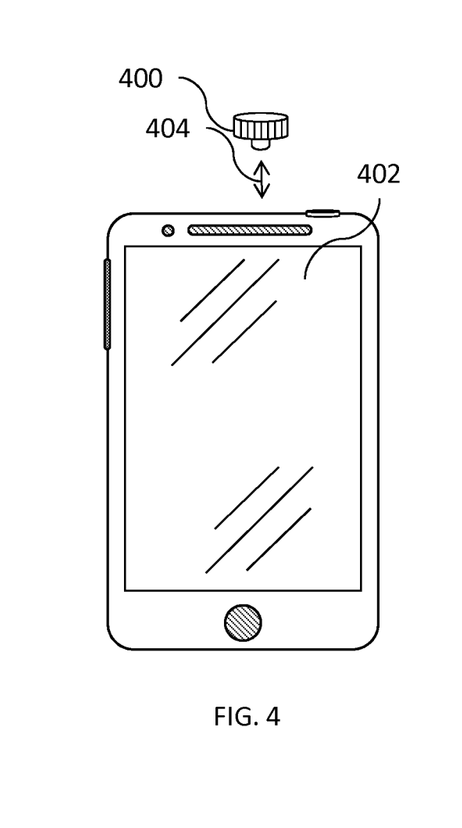

FIG. 4 illustrates a rotary knob 400 connected to a client device 402 according to some other embodiments. In the illustrated embodiment, client device 402 is a cellular phone although other client devices may be used in other embodiments. Rotary knob 400 may be connected wirelessly to client device 402 as indicated by arrow 404. In an embodiment, the wireless connection may be a low-energy (LE) Bluetooth connection. Other wireless connections, such as, regular Bluetooth may also be used. Rotary knob 300 includes embedded electronic circuits transmit a signal to client device 402 to covey a position of rotary knob 400. A PoC client (or other app) on client device 402 may then perform PoC operations based on a signaled position of rotary knob 400 as described above. In some embodiments, rotary knob 400 may be in close proximity to client device 402. For example, rotary knob may be attached to a surface of client device 402 by an adhesive layer. Alternatively, rotary knob 400 may not be physically attached to client device 402. A PoC client (or other app) on client device 402 may then perform PoC operations based on a signaled position of rotary knob 400 as described above.

Figure 5A:
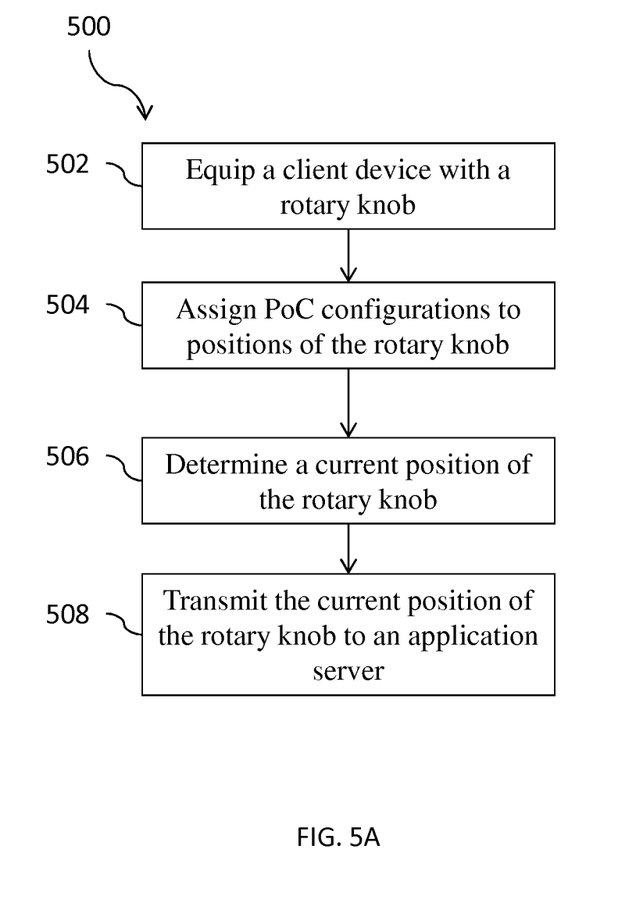
FIGS. 5A and 5B illustrate process flows of client device and application server operations in accordance with some embodiments.

FIG. 5A illustrates a process flow 500 for client device operations in accordance with some embodiments. In step 502, a rotary knob having a plurality of possible positions is equipped on a client device. The rotary knob may include electronic circuitry that communicates with the client device so that the client device can determine a position the rotary knob is dialed to. In some embodiments, the rotary knob is an embedded part of the client device, connected to the client device using a wired interface (e.g., an audio jack, lightning port, USB, and the like), connected to the client device using a wireless interface (e.g., LE Bluetooth, Bluetooth, or the like), or have any other suitable interface with the client device. In step 504, PoC configurations are optionally assigned to one or more of the rotary knob's positions by the client device. In another embodiment PoC configurations are assigned to rotary knob positions at a server (or other device) instead of the client device. In such embodiments, the client device may signal to the server that a rotary knob has been connected and is ready for PoC configuration assignment. The PoC configurations may affect call origination only or both call origination and call termination. Other PoC operations may also vary depending on the PoC configuration of a selected knob position. In step 506, the client device determines a current position of the rotary knob. For example, the client device may receive a signal the rotary knob's position from a signal transmitted wirelessly or through a wired connection. Next, in step 508, the rotary knob transmits the rotary knob's current position to an application server performing PoC operations on behalf of the client device. In some embodiments, the rotary knob may also transmit the PoC configurations assigned to each rotary knob position to the application server.

Figure 5B:
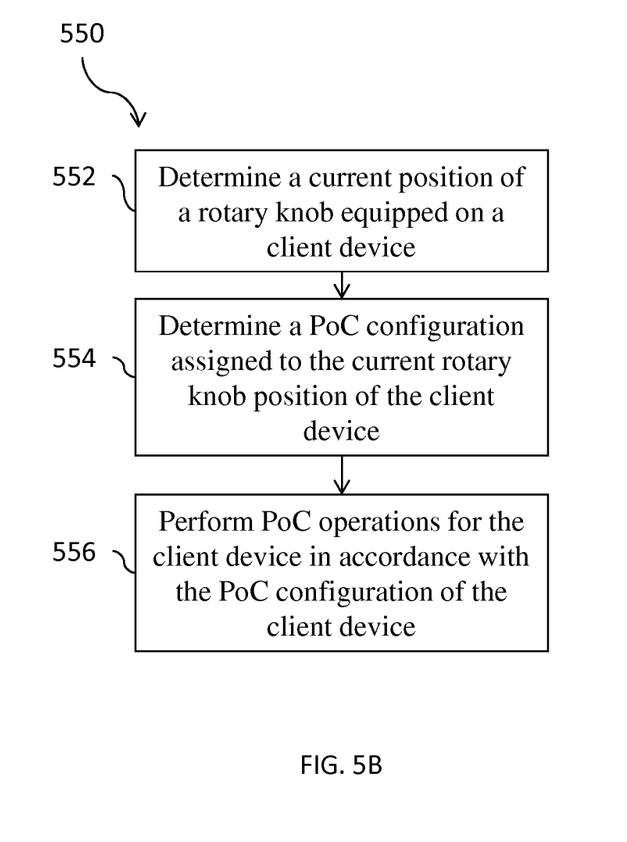

FIG. 5B illustrates a process flow 550 for server operations in accordance with some embodiments. In step 552, the application server determines a current position of a rotary knob equipped on a client device. For example, the client device may transmit the rotary knob position to the server. In step 554, application server determines a PoC configuration assigned to the current rotary knob position of the client device. Determining the PoC configuration assigned to the current rotary knob position may include receiving PoC configurations assigned to each position of the rotary knob from the client device or another server. In step 556, the server performs PoC operations in accordance with the current PoC configuration of the client device. For example, an operation triggered by pushing a PTT button may vary depending on the position of the rotary knob. Furthermore, incoming calls from other users and/or groups may or may not be blocked at an application server based on the position of the rotary knob.

As described above, a client device is equipped with a rotary knob having a dial, which can be set to a plurality of different positions. Particular PoC configurations are assigned to each rotary knob position, and the client configurations may affect PTT origination only, both origination and termination, or any other PoC functions. During operations, the PoC client may perform functions in accordance with the PoC configuration of the rotary knob's position. Thus, rotary knobs may be included in a client device to provide an improved user PoC experience.

Figure 6:
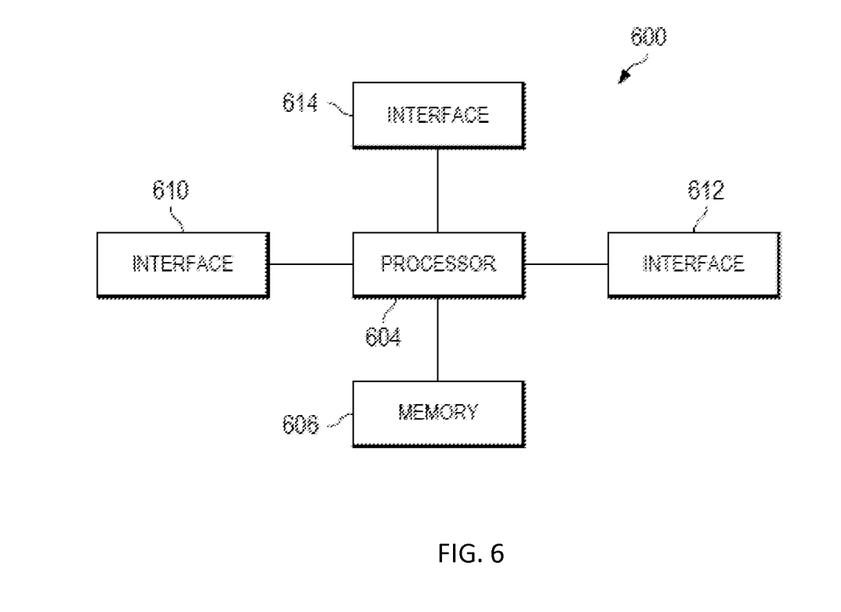
FIG. 6 illustrates a diagram of an embodiment processing system.

FIG. 6 illustrates a block diagram of an embodiment processing system 600 for performing methods described herein, which may be installed in a host device. As shown, the processing system 600 includes a processor 604, a memory 606, and interfaces 610-614, which may (or may not) be arranged as shown in FIG. 6. The processor 604 may be any component or collection of components adapted to perform computations and/or other processing related tasks, and the memory 606 may be any component or collection of components adapted to store programming and/or instructions for execution by the processor 604. In an embodiment, the memory 606 includes a non-transitory computer readable medium. The interfaces 610, 612, 614 may be any component or collection of components that allow the processing system 600 to communicate with other devices/components and/or a user. For example, one or more of the interfaces 610, 612, 614 may be adapted to communicate data, control, or management messages from the processor 604 to applications installed on the host device and/or a remote device. As another example, one or more of the interfaces 610, 612, 614 may be adapted to allow a user or user device (e.g., personal computer (PC), etc.) to interact/communicate with the processing system 600. The processing system 600 may include additional components not depicted in FIG. 6, such as long term storage (e.g., non-volatile memory, etc.).

In some embodiments, the processing system 600 is included in a network device that is accessing, or part otherwise of, a telecommunications network. In one example, the processing system 600 is in a network-side device in a wireless or wireline telecommunications network, such as a base station, a relay station, a scheduler, a controller, a gateway, a router, an applications server, or any other device in the telecommunications network. In other embodiments, the processing system 600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 7:
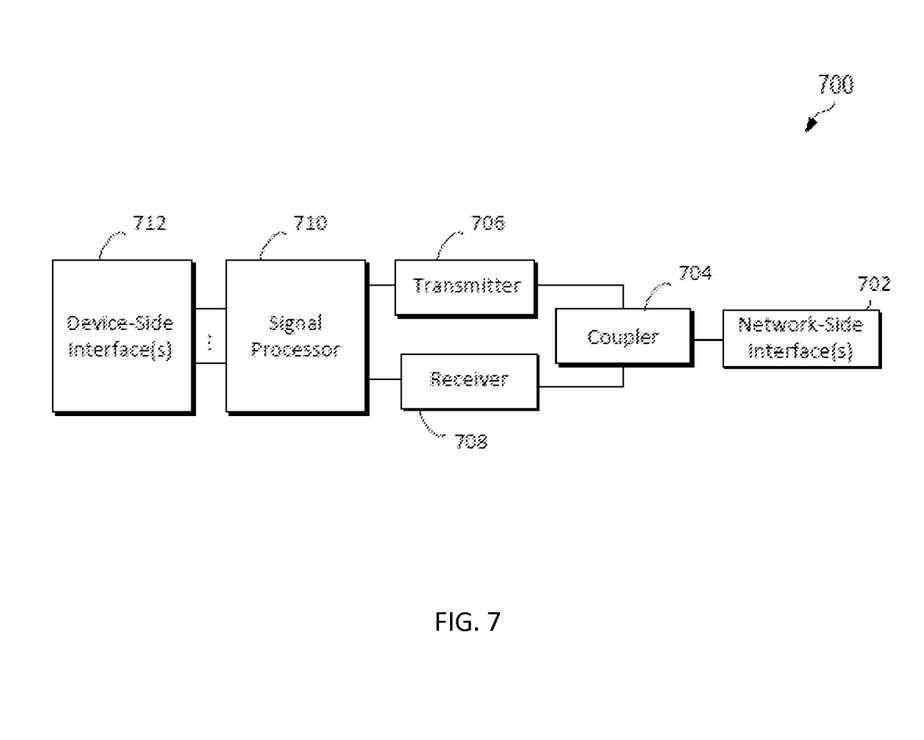
FIG. 7 illustrates a diagram of an embodiment transceiver.

In some embodiments, one or more of the interfaces 610, 612, 614 connects the processing system 600 to a transceiver adapted to transmit and receive signaling over the telecommunications network. FIG. 7 illustrates a block diagram of a transceiver 700 adapted to transmit and receive signaling over a telecommunications network. The transceiver 700 may be installed in a host device. As shown, the transceiver 700 comprises a network-side interface 702, a coupler 704, a transmitter 706, a receiver 708, a signal processor 710, and a device-side interface 712. The network-side interface 702 may include any component or collection of components adapted to transmit or receive signaling over a wireless or wireline telecommunications network. The coupler 704 may include any component or collection of components adapted to facilitate bi-directional communication over the network-side interface 702. The transmitter 706 may include any component or collection of components (e.g., up-converter, power amplifier, etc.) adapted to convert a baseband signal into a modulated carrier signal suitable for transmission over the network-side interface 702. The receiver 708 may include any component or collection of components (e.g., down-converter, low noise amplifier, etc.) adapted to convert a carrier signal received over the network-side interface 702 into a baseband signal. The signal processor 710 may include any component or collection of components adapted to convert a baseband signal into a data signal suitable for communication over the device-side interface(s) 712, or vice-versa. The device-side interface(s) 712 may include any component or collection of components adapted to communicate data-signals between the signal processor 710 and components within the host device (e.g., the processing system 600, local area network (LAN) ports, etc.).

The transceiver 700 may transmit and receive signaling over any type of communications medium. In some embodiments, the transceiver 700 transmits and receives signaling over a wireless medium. For example, the transceiver 700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 702 comprises one or more antenna/radiating elements. For example, the network-side interface 702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
    determining, by a server, a current position of a rotary knob equipped on a client device connected to the server;
    determining, by the server, a push-to-talk (PTT) over cellular (PoC) configuration assigned to the current position of the rotary knob, wherein the client device assigns a PoC configuration to each of a plurality of possible positions of the rotary knob independently from the server, and wherein the PoC configuration assigned to the current position of the rotary knob allows the client device to receive PTT calls from one or more pre-assigned groups and blocks the client device from receiving PTT calls from groups other than then one or more pre-assigned groups; and performing, by the server, PoC operations for the client device in accordance with the PoC configuration assigned to the current position of the rotary knob.

2. The method of claim 1, wherein the PoC configuration assigned to the current position of the rotary knob triggers no action, call origination to a most recent history event, call origination to a user assigned contact, call origination to a user assigned pre-arranged group, or a combination thereof when a PTT button of the client device is pressed and the client device is idle.

3. The method of claim 2, wherein the PoC configuration assigned to the current position of the rotary knob triggers talk back or call origination with pre-emption when a PTT button of the client device is pressed and the client device is not idle.

4. The method of claim 1, wherein PTT calls from the groups other than the one or more pre-assigned groups are blocked at an application server.

5. The method of claim 1, the PoC configuration assigned to the current position of the rotary knob further determines whether incoming one-to-one PTT calls, ad-hoc PTT calls, or a combination thereof are allowed.

6. The method of claim 1, wherein the PoC configuration assigned to the current position of the rotary knob allows the client device to receive PTT from a plurality of pre-assigned groups, and wherein the PoC configuration further assigns priorities to each of the plurality of pre-assigned groups.

7. The method of claim 1, wherein the PoC configuration assigned to the current position of the rotary knob inhibits PTT call transmissions, by the client device, from reaching an intended target by blocking the PTT call transmission at the server.

8. The method of claim 1, wherein determining the current position of the rotary knob comprises receiving, by the server, the current position of the rotary knob from the client device.

9. The method of claim 1, wherein determining the PoC configuration comprises receiving, by the server, the PoC configurations assigned to each of the plurality of possible positions of the rotary knob from the client device.

10. The method of claim 1 further comprising filtering, by the server, incoming calls to the client device independently from the current position of the rotary knob.

11. An application server comprising:
a processor; and
a computer readable storage medium storing programming for execution by the processor, the programming including instructions to:
receive a current position of a rotary knob equipped on a client device;
determine a push-to-talk (PTT) over cellular (PoC) configuration assigned to the current position of the rotary knob, wherein the client device assigns a PoC configuration to each of a plurality of possible positions of the rotary knob independently from the application server; and
perform PoC operations for the client device in accordance with a PoC configuration assigned to the current position of the rotary knob, wherein the PoC configuration assigned to the current position of the rotary knob comprises instructions to:
allow PTT calls from one or more pre-assigned groups;
block PTT calls from groups other than then one or more pre-assigned groups; and
designate whether one-to-one PTT calls, ad-hoc PTT calls, or a combination thereof are allowed.

12. The application server of claim 11, wherein the PoC configuration assigned to the current position of the rotary knob comprises instructions to:
trigger no action, originate a call to a most recent history event, originate a call to a user assigned contact, originate a call to a user assigned pre-arranged group, or a combination thereof when a PTT button is pressed and there is not a current PTT call on the client device; and
talk back or originate a call with pre-emption when a PTT button is pressed and a PTT call is ongoing on the client device.

13. The application server of claim 12, wherein incoming call filtering is independent from the current position of the rotary knob.

14. The application server of claim 11, wherein the instructions to determine the PoC configuration assigned to the current position of the rotary knob comprises receiving the PoC configurations assigned to each of the plurality of possible positions of the rotary knob from the client device or from another server.

15. A rotary knob comprising:
a dial configured to be turned to one of a plurality of possible positions;
a position sensor configured to detect a position of the dial; and
a transmitter configured to transmit the position of the dial to a client device, wherein the client device is configured to detect when the rotary knob is connected using a rotary knob detection protocol, wherein the rotary knob detection protocol comprises lightweight peer discovery, authentication, command, and response data overlaid over an access interface between the rotary knob and the client device, and wherein a server connected to the client device is configured to:
determine a push-to-talk (PTT) over cellular (PoC) configuration assigned to the position of the dial; and
perform PoC operations for the client device in accordance with the PoC configuration assigned to the position of the dial.

16. The rotary knob of claim 15 further comprising a wired connection interface configured to be plugged into the client device, wherein the transmitter is configured transmit the position of the dial to the client device over the wired connection interface.

17. The rotary knob of claim 16, wherein the wired connection interface comprises a lightning connector or a universal serial bus (USB) connector.

18. The rotary knob of claim 15, wherein the transmitter are configured to transmit the position of the dial to the client device over a wireless connection.

19. The rotary knob of claim 18, wherein the wireless connection comprises a Bluetooth connection or a low energy Bluetooth connection.

* * * * *